United States Patent [19]
Lee

[11] Patent Number: 5,257,098
[45] Date of Patent: Oct. 26, 1993

[54] PRINTING METHOD OF COLOR VIDEO PRINTER

[75] Inventor: Jae-Gyun Lee, Suwon, Rep. of Korea

[73] Assignee: SamSung Electronics Co., Ltd., Suwon, Rep. of Korea

[21] Appl. No.: 815,514

[22] Filed: Jan. 2, 1992

[30] Foreign Application Priority Data

Feb. 13, 1991 [KR] Rep. of Korea .............. 1991-2393

[51] Int. Cl.$^5$ .............................................. H04N 1/23
[52] U.S. Cl. ................................... 358/500; 358/296; 346/76 PH; 346/1.1
[58] Field of Search ................... 346/76 PH, 1.1; 400/120; 358/455, 458, 460, 296, 75

[56] References Cited

U.S. PATENT DOCUMENTS 4,990,930 2/1991 Ludden et al. ................ 346/76 PH

Primary Examiner—Edward L. Coles, Sr.
Assistant Examiner—Scott A. Rogers
Attorney, Agent, or Firm—Robert E. Bushnell

[57] ABSTRACT

A high-speed printing method capable of considerably reducing a printing time consumption in a color video printer having at least one line memory coupled to receive at least one line data indicative of a given color image from a video memory, and provided with a plurality of gradation data corresponding to a respective color component, comprising the steps of searching the largest value of one line data out of the line memory, of designating the largest value as a maximum value of heating gradation relative to the one line data, and of terminating one cycle of printing operation for the one line data when reaching the maximum value of the heating gradation, irrespectively of a total heating gradation number.

8 Claims, 4 Drawing Sheets

FIG. 4a
FIG. 4b
FIG. 4c
FIG. 4d
FIG. 4e

PRINTING METHOD OF COLOR VIDEO PRINTER

BACKGROUND OF THE INVENTION

The present invention relates to a printing method in a video printer and, in particular, a high-speed printing method for efficiently reducing a printing time needed to print one document line in a color video printing apparatus having a line memory, thereby enabling a high-speed printing of a document.

In general, it has been known that three elementary colors of Cyan, Magenta and Yellow for printing a given document image in a color video printer may be obtained from a given color conversion process of the so-called, three primary colors Red, Green and Blue of a light ray. The former three colors are mixed to each other to produce a desired color image in the color video printer. That is, the latter three primary colors Red, Green and Blue are respectively, or compositively, converted to the former three elementary colors Yellow, Magenta and Cyan to obtain a desired number of color gradation, for example, 256 gradations of representing a given color image.

In a conventional printing method, for the color video printer utilizing 256 gradations to print one document line from a line memory, a total of 256 times of thermal print head operations are required to complete printing of one line, which operations have no particular reference to the gradations and are carried out either in a thermal or in a non-thermal state. In this case, the total 256 times of thermal print head operations should be always carried out irrespectively of a gradation characteristic in the corresponding line, which inevitably may lead to an unnecessarily long printing time on a color video printer.

For example, when making a print for a given video image provided from a television screen to a color video printer, all of the three elementary colors Yellow, Magenta and Cyan may not be used in their respective maximum degree of thickness. Hence, there is would be no need to have a thermal print head of the color video printer operating 256 times for each color representation.

It is therefore an object of the present invention to provide a high-speed printing method capable of considerably reducing a printing time consumption in a color video printer by having at least one line memory.

According to one aspect of the invention, the method may be achieved by limiting a frequency of thermal operation in a thermal printing device of a printer below the maximum gradation number of a print line.

According to another aspect of the invention, the method preferably includes a method of controlling printing in a color video printer having at least one line memory provided with a plurality of gradation data corresponding to a respective color component, the line memory for receiving at least one line data indicative of a given color image from a video memory, the method further comprising the steps of:

searching the largest value of one line data from the line memory;

designating the largest value as a maximum value of heating gradation relative to the one line data; and terminating one cycle of printing operation for the one line data when reaching the maximum value of the heating gradation, irrespectively of a total heating gradation number.

BRIEF DESCRIPTION OF THE DRAWINGS

A more complete appreciation of the invention, and many of the attendant advantages thereof, will be readily enjoyed as the same becomes better understood by reference to the following detailed description when considered in conjunction with the accompanying drawings in which like members indicate the same or similar components, wherein:

FIG. 1 shows a schematic block diagram of a part of a color video printer that the present invention is applied to;

FIG. 4a to 4e show some operation stages according to FIG. 1 block diagram.

DETAILED DESCRIPTION OF THE INVENTION

Figure 1:
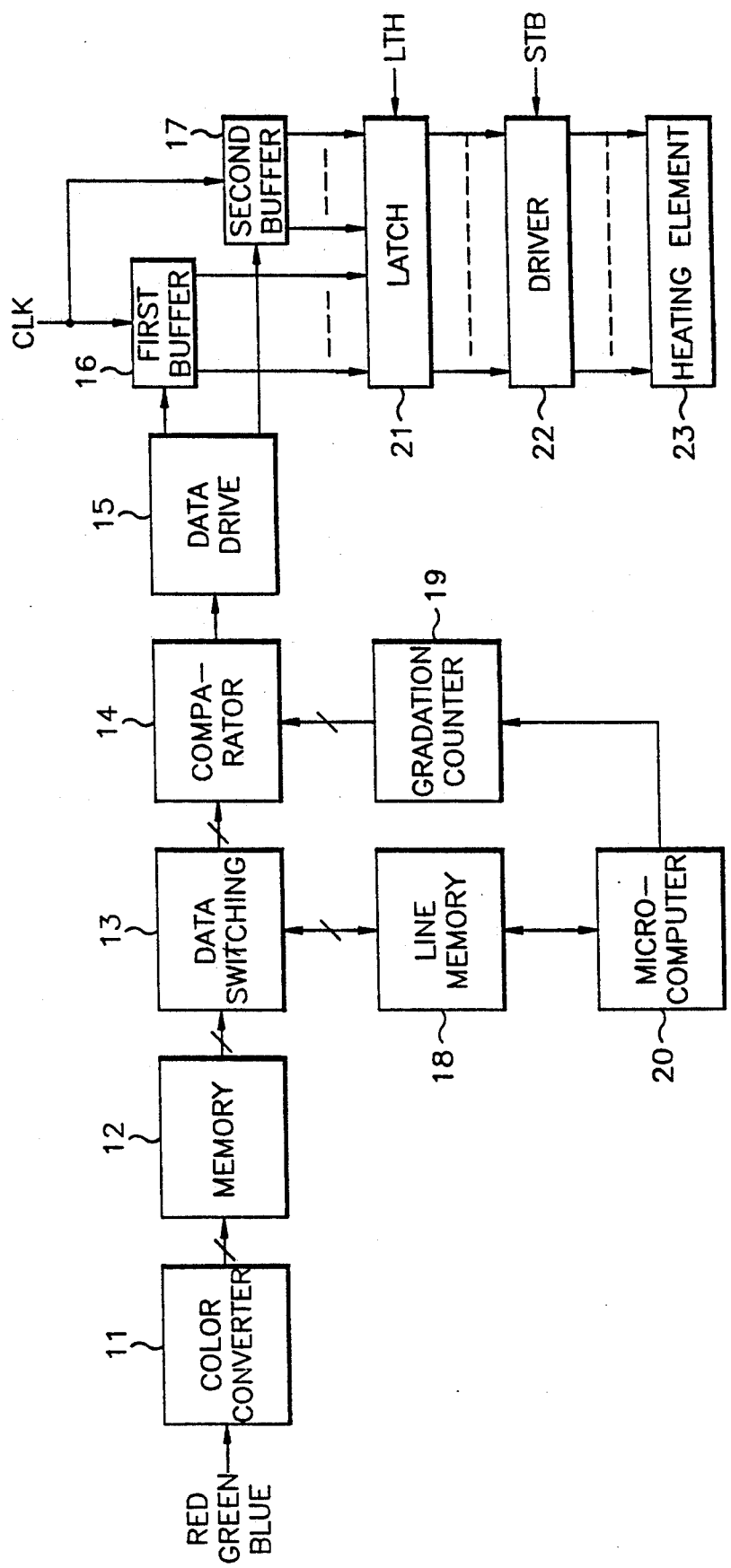

Referring to FIG. 1, a color video printer wherein a high-speed printing method is applied comprises a microcomputer 20 for controlling all the operations in the color video printer; a line memory 18 for storing gradation data to be read or written under control of the microcomputer 20; a gradation counter 19 responsive to the microcomputer 20 for counting a gradation number in the video printer. Three primary colors Red, Green and Blue provided by a video RAM (not shown) are converted into three elementary color components Cyan, Magenta and Yellow to be used later, which components are put into a memory 12 together with various control data to control a thermal print head in the printer. A comparator 14 compares the gradation data read out of the line memory 18 with the counted value of the gradation counter 19. A data switching circuit 13, coupled to the memory 12 and the line memory 18, provides a part of the data retrieved from the memory 12 to the line memory or enables transmission of data from the line memory to the comparator. A data driver 15 enables transmission of the output of the comparator 14 to either one of a first buffer 16 or a second buffer 17 in dependence upon an address provided from the line memory. Both of the first and second buffers are to enable transmission of the output of the data driver is in synchronism with a clock, to a latch 21 respectively. Upon reception of a latch signal (LTH), the latch 21 receives gradation data from the first and second buffers and latches the received data to a driver for driving a thermal head assembly upon reception of a strobe signal (STB).

Figure 3:
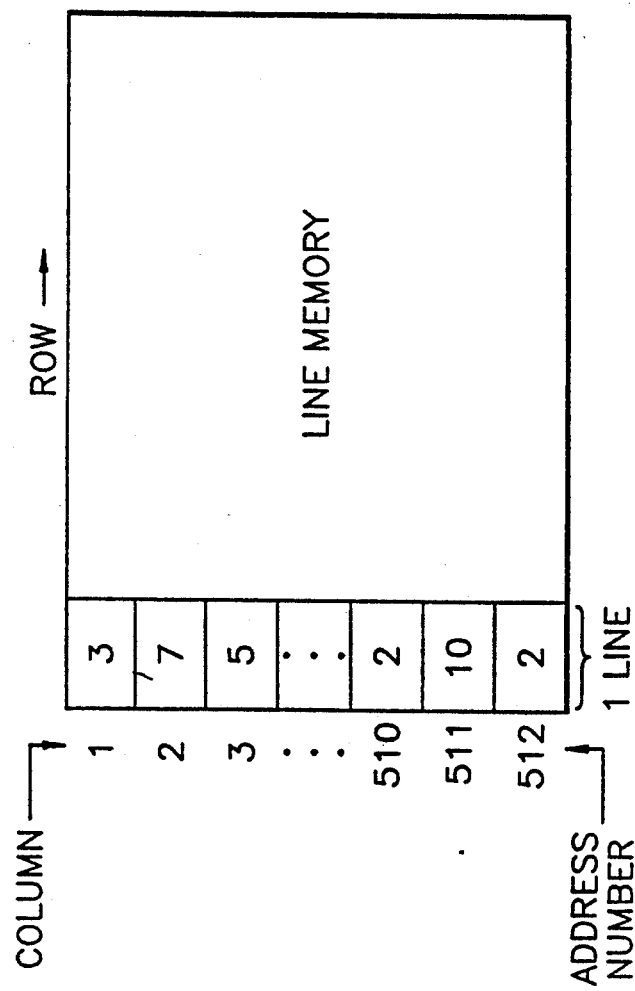
FIG. 3 shows a schematic diagram indicative of a preferred embodiment of a line memory used in the invention.
Figures 4A, 4B, 4C, 4D, 4E:
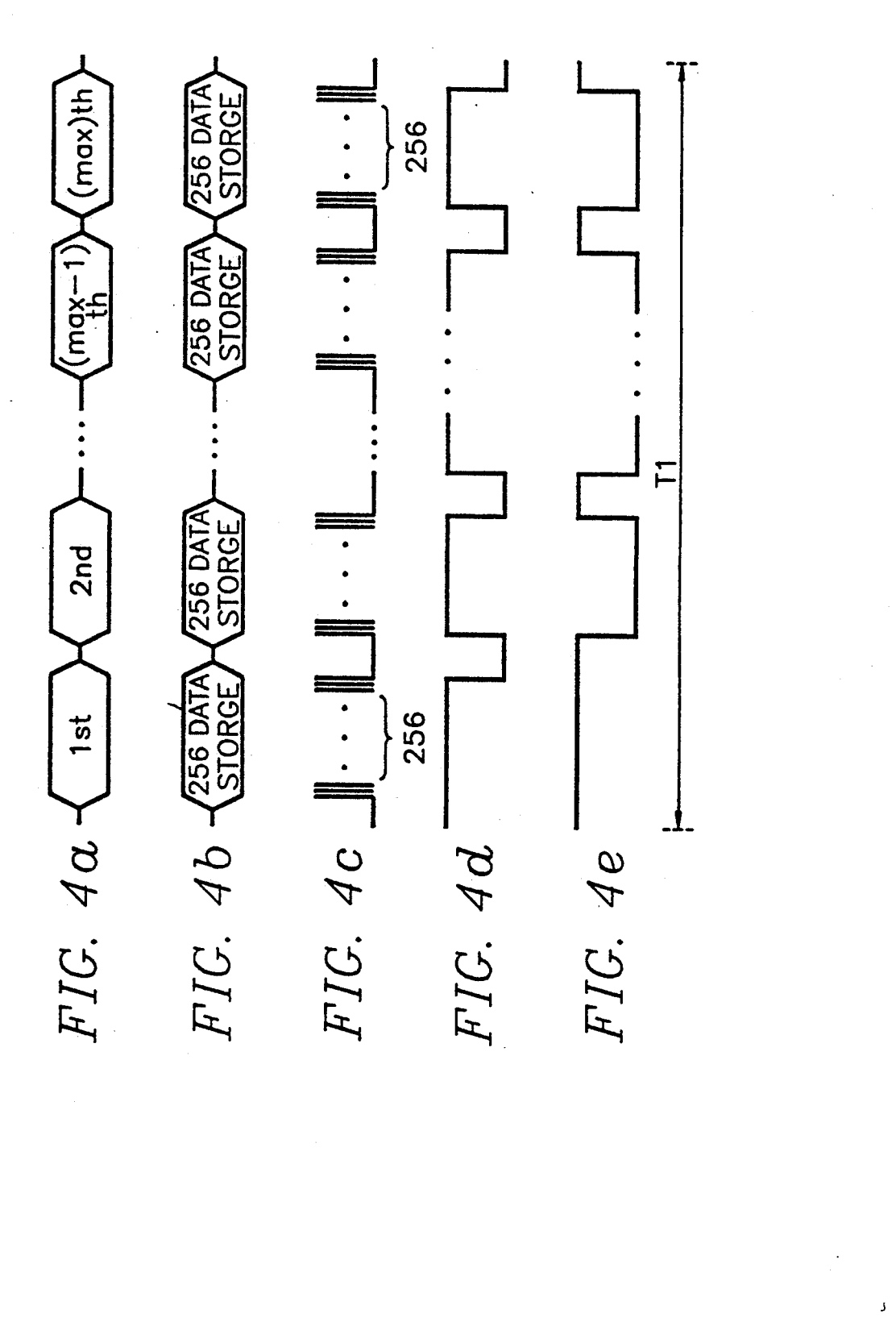

FIG. 3 is an exemplary diagram showing that a given number of gradation is stored into a respective address location corresponding to each line of the line memory; and FIGS. 4a to 4e are timing diagrams illustrating various operative stages of FIG. 1. FIG. 4a represents a data waveform to be stored into the first buffer 16. FIG. 4b represents a data waveform to be stored into the second buffer 17. FIG. 4c a clock; FIG. 4d a latch signal (LTH), and 4e represents a strobe signal (STB), having a printing duration of T1 for each print line of the printer.

Referring back again to FIG. 1, data of one print line retrieved in sequence from line memory 18 is compared with a series of gradation count numbers from the gradation counter 19, in either one set of odd numbers, viz., 1,3,5,7 . . . 255 and even numbers, viz., 2,4,6,8 . . . 256, by the comparator in order to produce a logic high or low signal in dependence upon the status of the data. A logic high signal is produced if the data is larger than the gradation counter numbers, while a logic low signal is produced if the data is less than the gradation counter number. The data driver 15 receives the logic high or low signal from the comparator 14 and drives the received data to either one of the first buffer 16 and the second buffer 17, in dependence upon an address of the retrieved data in the line memory 18, wherein the lower addresses of 1 to 256 are delivered to the second buffer and the higher addresses 512 are delivered to the first buffer.

The data stored in the first and second buffers, as shown in the waveforms of FIGS. 4a and 4b, is latched by the latch circuit 21 in dependence upon a reception of a latch signal (LTH) having a low logic level of FIG. 4d, generated subsequent to an occurrence of 256 clocks of FIG. 4c. Thereafter, when a strobe signal (STB) goes low, as shown in FIG. 4e, prior to latching the next line memory data, the driver 22 receives the latched data from the latch 21 for driving the thermal head assembly 23. A driving time in the thermal head assembly needed to perform a color printing for one line in the driver 22 is limited to a maximum gradation number for the corresponding line.

Figure 2:
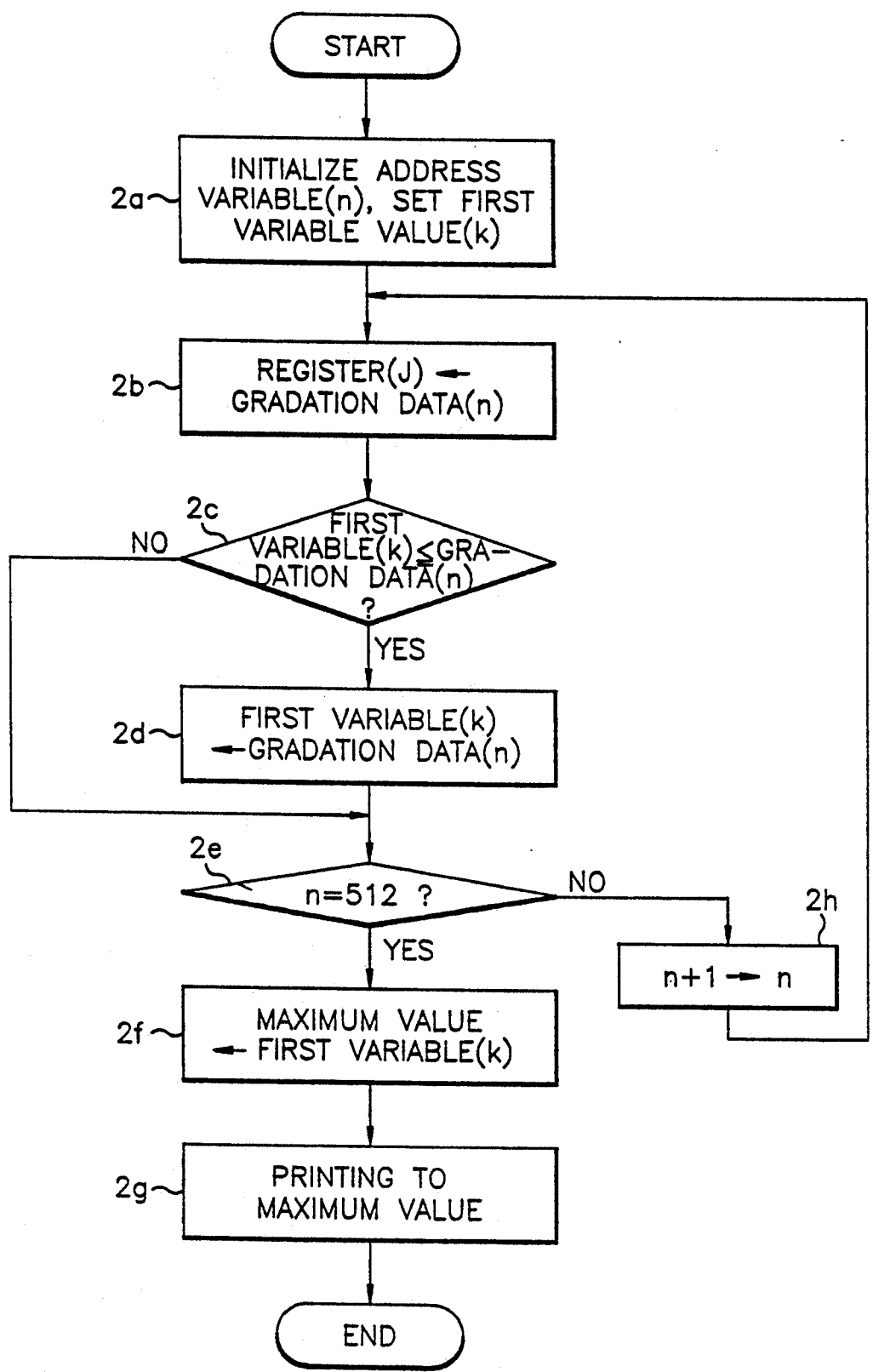
FIG. 2 shows a flow chart of a printing method according to the invention.

The microcomputer 20 carries out a detection of the maximum gradation number to in order control the driver 22. For example, assuming that a series of addresses (1 through 512) in one line of the line memory 18 have a plurality of gradation data as shown in FIG. 3 and that its maximum gradation data may be '10' in the 511th address location, the microcomputer 20 initializes an address variable (n) designating a given address in the line memory, that is, n=1, and then sets gradation data (=3) of a first address location into a first variable value (k), in step 2a of FIG. 2. Thereafter, in step 2b, the data in the first address location is stored into a register (J). The first variable value (k) is then checked in step 2c whether it is equal to or smaller than the data of the first (n=1) address location. Here, because the data is 3, the first variable value (k) is also 3. If n=1, for example, then step 2d is carried out to maintain the first variable value (k) as it is. In a decision block of step 2e, the address variable (n) is checked whether it reaches a number of 512. If the address variable (n) does not reach the number of 512, is added in step 2h and returned to step 2b again. That is, the steps 2b through 2e are repeated until the address variable (n) finally reaches the number of 512 in the step 2e. As a result of a close loop operation of the steps 2b through 2e, the final first variable value (k) after 512 times of comparing operation will be 10' in reference to the exemplary one line of the line memory of FIG. 3. Therefore, the value 10' is designated as a maximum gradation data in step 2f, and the heating element 23 is driven at only 10 times prior to execution of a next line printing.

Therefore, for example, assuming that a Yellow color element is to be printed with a half degree (50%-thick Yellow), not a full degree (100%-thick Yellow), it would be enough to drive the heating element only 128 times, and not 256 times as required by the conventional video printer. A total time consumption necessary to one print line from the line memory having a 50%-thick is reduced by at least one half. For instance, a 128-gradation of a given color component, for example, of Yellow, will consume a maximum printing time of 8.192 msec (=64 μsec×128), which is considerably faster than 16.384 msec (=64 μsec ×256) for a 100%-thick, 256-gradation color component. Thus, a printing time is decreased for one print line up to a half of the time required for the case of a conventional 256 gradation printing.

Moreover, since a usual color video printer employs three kinds of colors such as Yellow, Magenta and Cyan, a total time of about 24 msec (8 msec×3=24 msec) would be saved and more time could be decreased in case where less thick color is applied to the video printer, for example, for 30% thick Yellow color component in one print line from the line memory.

As is understood from the aforementioned description of a preferred embodiment of the present invention, a maximum gradation data of one memory line in a line memory of a color video printer is determined, by which maximum data a heating element is driven to printing. Thus, the invention eliminates waste of printing time, thereby video printer.

What is claimed is:

1. A method of controlling printing in a color video printer having at least one line memory provided with a plurality of gradation levels representative of a density level to be printed for a respective color component of a color image, said line memory receiving at least one print line data from a video memory, said method comprising the steps of:
   searching for a largest value of said plurality of gradation levels representative of the density level for each color of said color image for each print line data of said line memory by initializing an address designation variable indicative of a given address of each print line of said video signals, storing gradation levels corresponding to said address designation variable into a gradation data register, and comparing said gradation levels with initial or preceding gradation levels stored in said gradation data register to obtain the largest value of each print line of said color image;
   designating the largest value of said plurality of gradation data as a maximum value of heating gradation for each print line data; and
   terminating one cycle of a printing operation for said one print line data when the largest value of said plurality of gradation data designates as said maximum value of the heating gradation irrespective of a maximum number of heating gradation obtainable from the print line data.

2. The method as set forth in claim 1, further comprises of the step of adding said address designation variable one by one until the maximum number of heating gradation is reached.

3. A thermal print apparatus having a thermal head assembly comprising an array of thermal elements for printing a video image on a printable medium, comprising:
   means for receiving video signals on a line-by-line basis;
   memory means having a plurality of addresses for storing a corresponding plurality of gradation levels representative of density levels of single image lines of video signals received on a line-by-line basis;
   processor means for searching for a maximum value of gradation levels of each image line of said video signals to provide print gradation data representative of a printing time for each image line of said video signals by initializing an address designation variable within said plurality of addresses storing corresponding gradation levels of each line of said video signals, setting a designated gradation level of said address designation variable, and comparing the gradation levels of each of said plurality of addresses with said designated gradation level to detect the maximum value of gradation levels of each image line of said video signals;

comparator means for generating printing signals in dependence upon comparison of each image line of said video signals with corresponding print gradation data; and driver means for enabling transmission of said printing signals and for driving the thermal head assembly to print symbols representative of said printing signals on a line-by-line basis in dependence upon said print gradation data corresponding to each image line of said video signals.

4. The thermal print apparatus as claimed in claim 3, wherein said processor means terminates a printing operation of each image line of said video signals when the maximum value of said plurality of gradation levels is searched to thereby adjust the printing time for each image line of said video signals.

5. The thermal print apparatus as claimed in claim 3, further comprised of means for controlling the printing time period of each image line of said video signals by controlling operations of said memory means and said processor means.

6. A thermal print apparatus having a thermal head assembly for printing a video image on a printable medium, comprising:

means for receiving video signals on a line-by-line basis;

memory means having a plurality of addresses for storing a plurality of corresponding gradation levels representative of density levels of single image lines of said video signals on a line-by-line basis;

means for counting a number of gradation levels of each print image line of said video signals stored in said plurality of addresses, for searching for a maximum value of gradation levels of each print line to provide print gradation data by initializing an address designation variable within said plurality of addresses, setting a designated gradation level of said address designation variable, and successively comparing the gradation levels of each of said plurality of addresses with said designated gradation level to detect the maximum value of gradation levels of a print image line of said video signals;

means for driving said video signals to the thermal head assembly to print symbols representative of said video signals on a line-by-line basis during a printing time period in dependence upon said print gradation data corresponding to each image line of said video signals.

7. The thermal print apparatus as claimed in claim 6, further comprised of means for controlling the printing time period of each line of said video signals by controlling operations of said memory means and said counting means.

8. The thermal print apparatus as claimed in claim 7, wherein said controlling means controls the printing time period by terminating a printing operation of each image line of said video signals when the maximum value of said plurality of gradation levels is detected to thereby adjust the printing time period for each image line of said video signals irrespectively of a maximum value of a plurality of gradation levels obtainable from each of said image line of said video signals.

* * * * *

UNITED STATES PATENT AND TRADEMARK OFFICE
CERTIFICATE OF CORRECTION

PATENT NO. : 5,257,098
DATED : October 26, 1993
INVENTOR(S) : Jae-Gyun Lee

It is certified that error appears in the above-indentified patent and that said Letters Patent is hereby corrected as shown below:

On the Title page, item [54], and col 1, lines 1 and 2, change "PRINTING METHOD OF COLOR VIDEO PRINTER" to --A HIGH-SPEED PRINTING METHOD FOR A THERMAL COLOR PRINTER--.

Column 6, line 8, claim 6, insert --image--after "print".

Signed and Sealed this

Fifth Day of April, 1994

Attest:

BRUCE LEHMAN

*Attesting Officer*  *Commissioner of Patents and Trademarks*